United States Patent Office 3,165,527
Patented Jan. 12, 1965

3,165,527
PYRIDYL AMINO LOWER ALKANE DERIVATIVES AND PROCESS
Allan Poe Gray, Decatur, Ill., assignor to Neisler Laboratories, Inc., Decatur, Ill., a corporation of Delaware
No Drawing. Filed Nov. 3, 1960, Ser. No. 73,157
10 Claims. (Cl. 260—295)

This invention relates to compositions of matter of the class of substituted amino alkanes.

The invention resides in the concept of compositions having a molecular structure in which there is attached to the same carbon atom of a secondary—or tertiary—amino lower alkane chain both a hydroxy radical or a lower-acyloxy group, and, at least one monocarbocyclic group; said carbon atom to which such groups are attached being separated by at least one carbon atom from the amino nitrogen atom; wherein one of the amino-nitrogen substituents is the pyridyl radical joined to the amino nitrogen atom through a ring carbon atom of the pyridyl ring; and, wherein the other amino-nitrogen substituent is a lower-alkyl group where the amino nirtogen atom is tertiary. The inventive concept includes the acid-addition salts and quaternary ammonium salts of such substituted amino alkanes, the embodiments of such salts being the functional equivalents of such free bases. The invention also resides in the concept of a process for making such compositions, as hereinafter described.

Definition of terms:

The term "lower alkanes," as used herein, means lower alkanes having 2 to 5 carbon atoms inclusive, as ethane, propane, butane, and pentane, including both straight and branched-chain structural isomers thereof.

The term "lower-acyloxy," as used here, includes the lower-alkanoyloxy groups, such as formoyl, acetoxy, propionyloxy, butyryloxy; carbamyloxy; the N-lower-alkyl-substituted carbamyloxy groups, such as N-methyl-carbamyloxy, N-ethylcarbamyloxy, N-propylcarbamyloxy, N-butylcarbamyloxy; and the N, N-di-lower-alkyl-substituted carbamyloxy groups as N, N-dimethylcarbamyloxy, N,N-diethycarbamyloxy, N,N-dipropycarbamyloxy, et cetera.

The term "monocarbocyclic group" as used herein, includes the phenyl radical and the cycloalkyl radical. The term "phenyl radical" as used herein means the unsubstituted phenyl ring and includes as the full equivalent thereof such ring bearing one or more simple substituents not adversely affecting the pharmacological properties of the compound, and thus includes such groups as halogensubstituted phenyl e.g. o-chlorophenyl, p-bromophenyl; lower-alkoxy-phenyl e.g. p-methoxyphenyl; the tolyl radical; simple aralkyl groups e.g. benzyl, beta-phenylethyl, p-methylbenzyl. The term "cycloalkyl radical," as used herein means the unsubstituted cyclopentyl and cyclohexyl rings and includes as the full equivalent thereof such rings bearing one or more simple substituents not adversely affecting the pharmacological properties of the compound e.g. p-methyl-cyclohexyl, o-methoxycyclopentyl.

The term "pyridyl radical," as used herein, means the unsubstituted pyridyl ring and includes as the full equivalent thereof such ring bearing one or more simple substituents not adversely affecting the pharmacological properties of the compound such as a halogen atom, the methyl, methoxy, nitro, trifluoromethyl, and other groups commonly used in the art as substitutents on the pyridyl ring in preparing chemical compounds having pharmacological effects in animals. Such substituents can be introduced in any of the positions on the ring otherwise occupied by a hydrogen atom.

The term "lower alkyl," as used herein unless otherwise specifically limited, means alkyl groups having from 1 to 6 carbon atoms inclusive and is illustrated as by methyl, ethyl, n-propyl, isopropyl, et cetera.

The pyridyl amino alkane derivatives of the invention can be prepared by the reduction of starting intermediate pyridyl carbamyl alkanes. These intermediate pyridyl carbamyl alkanes can be prepared by the following processes: (1) reacting by heating a monocarbocyclic-hydroxy-lower-alkanoic acid with an aminopyridine alone or in a solvent inert to the reactants to form the pyridyl carbamyl alkane intermediates; (2) reacting a lower alkyl ester of a monocarbocyclic-hydroxy-lower-alkanoic acid with an aminopyridine to form the pyridyl carbamyl alkane intermediates; and, (3) reacting a monocarbocyclic acyloxy lower-alkanoyl chloride with an aminopyridine to form the pyridyl carbamyl alkane intermediates.

The pyridyl amoino alkanes of the invention can be prepared by the following processes: (4) introducing the pyridyl carbamyl alkane intermediate, formed according to (1), (2), and (3) above, into a slurry of lithium aluminum hydride to reduce the pyridyl carbamyl alkane intermediate to the pyridyl amino alkane derivative; (5) reacting a monocarbocyclic alkanolamine with a chloropyridine or bromopyridine to form the pyridyl amino alkane derivative; (6) reacting a (beta-hydroxy-beta-monocarbocyclic-alkyl)-secondary-aminopyridine derivative with a lower aldehyde as formaldehyde to form an oxazolidine derivative, and introducing such oxazolidine derivative into a slurry of lithium aluminum hydride to form a (beta-hydroxy - beta - monocarbocyclic-alkyl)-tertiary-amino pyridine derivative; (7) reacting a (hydroxy-substituted - monocarbocyclic - substituted-alkyl) amino-pyridine with an esterifying agent to esterify the hydroxyl group; and, (8) reacting a monocarbocyclic-substituted-ethylene oxide with an aminopyridine in the presence of one equivalent of a basic condensing agent such as sodamide, sodium hydride or a sodium alkoxide as sodium methoxide or sodium ethoxide.

In forming the pyridyl amino alkane ester derivatives of the invention, as in process (7) above, among the esterifying agents that can be employed are alkanoic anhydrides as acetic anhydride, propionic anhydride, anhydrides as acetic anhydride, propionic anhydride, butyric anhydride; potassium cyanate; lower-alkyl isocyanates as methyl isocyanate, ethyl isocyanate, propyl isocyanate, butyl isocyanate; N,N - dialkylcarbamyl chlorides as N,N-dimethyl carbamyl chloride N,N-diethylcarbamyl chloride, N,N-dipropylcarbamyl chloride.

Alternatively, the carbamyloxy-substituted monocarbocyclic-substituted pyridyl amino alkanes of the invention can be formed by reacting a hydroxy-substituted monocarbocyclic-substituted pyridyl amino alkane with phosgene and treating the intermediate thus formed with ammonia.

The acid addition salts of the invention can be prepared by reacting a pyridyl amino alkane derivative of the invention with an inorganic acid as hydrochloric, hydrobromic, hydriodic, and sulfuric, or an organic acid as acetic, mucic, salicylic, citric, et cetera.

The quaternary ammonium salts of the invention can be prepared by reacting a pyridyl amino alkane derivative of the invention with a lower-alkyl ester including lower-alkyl halides as methyl bromide, methyl chloride, methyl iodide, et cetera, and aralkyl halides such as benzyl chloride.

The anions of the acid addition salts and of the quaternary salts can be exchanged for different anions, where desired, by conventional techniques.

The physical embodiments of the compounds of the invention all have pharmacological properties which indicate their utility as pharmacodynamic agents. Thus, the pyridyl amino alkane derivatives of the invention all exhibit analgesic activity in animal organisms. In addition to this activity in common, certain of the compounds produce, in animal organisms, varying responses of the barbiturate potentiating, interneuronal blocking and anti-fibrillatory type. These additional pharmacological activities are more specifically disclosed in the subsequent examples.

To aid in an understanding of the invention, the pyridyl amino alkane derivatives of the invention are illustrated by the following formula:

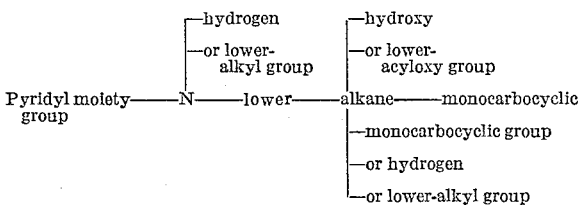

To further aid in understanding the invention, a particular group of compounds within the scope of the present invention will now be illustrated, in their free base forms. These are aminopyridines having the structure

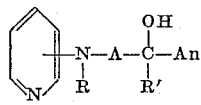

wherein R is hydrogen or a $C_{1-3}$ lower alkyl; R' is hydrogen or the phenyl radical; A is a $C_{1-3}$ lower alkylene; and An is a cyclohexyl or phenyl radical.

The following preparations illustrate the preparation of the pyridyl carbamyl alkane intermediates.

*Preparation 1: 2-mandelamidopyridine and salt thereof.*—Fit a flask with a moisture trap. Place in the flask 18.8 grams (0.2 mole) of 2-aminopyridine, 30.4 grams (0.2 mole) or dl-mandelic acid and 120 milliliters of xylene. Place the flask in an oil-bath. Reflux the reaction mixture for 20 hours by maintaining the oil-bath temperature at 165–170 degrees centigrade. During the 20-hour period, 3.2 milliliters (90 percent yield) of water collects in the moisture trap and an orange solution forms in the reaction flask. Cool the orange solution in the flask to precipitate a thick oil which partially crystallizes. Dilute the mixture of precipitate and solution with benzene. Filter the mixture to separate 23.2 grams of bright yellow crystals, melting at 117–119 degrees centigrade, from the benzene-xylene mother liquor. Recrystalize these crystals from aqueous ethanol to produce 20.0 grams of long, flat, almost colorless needle-shaped crystals melting at 119.5–121 degrees centigrade. Extract the original benzene-xylene mother liquor with dilute aqueous acid. Make the separated aqueous portion alkaline and extract it with ether. Dry the separated ether portion. Remove the ether from the ether portion by distillation. The residue left after removal of the ether is an oil which crystallizes on standing. Recrystallize these crystals from aqueous ethanol to yield an additional 6.15 grams of product melting at 118–121 degrees centigrade. Add this portion of product to the original 20.0 gram portion to achieve a total yield of 26.1 grams of 2-mandelamidopyridine (57 percent yield). Analyze a portion of the product as follows:

*Analysis:*—Calculated: Nitrogen (basic) 6.14 percent by weight. Found: 6.05 percent by weight.

To one molar equivalent of the base 2-mandelamidopyridine in ethanol add more than one molar equivalent of hydrogen chloride dissolved in ether. Recrystallize the resultant precipitate from a solvent mixture of methanol and ether to form colorless crystals of 2-mandelamidopyridine hydrochloride, melting at 182–184 degrees centigrade.

Analysis:

|  | Percent by weight | | |
| --- | --- | --- | --- |
|  | Carbon | Hydrogen | Ionic Chlorine |
| Calculated | 58.98 | 4.95 | 13.40 |
| Found | 59.23 | 4.90 | 13.14 |

*Preparation of 2: 2-Benzilamidopyridine and salt thereof.*—Dissolve 15.0 grams (0.16 mole) of 2-aminopyridine and 39.0 grams (0.16 mole) of methyl benzilate in 100 milliliters of dry xylene in a flask. Add 0.5 gram of metallic sodium. Fit an oil-bath around the reaction flask. Reflux the reaction mixture for 40 hours by maintaining the temperature of the oil-bath at 180–185 degrees centigrade. Cool the resultant solution and dilute it with benzene to precipitate a white solid. Recrystallize the white solid from isopropyl alcohol to yield 15.8 grams (32 percent yield) to produce 2-benzilamidopyridine in the form of colorless needle-shaped crystals, melting at 215–216 degrees centigrade. Analyze a portion of the product as follows:

*Analysis.*—Nitrogen (basic) percent by weight. Calculated: 4.69. Found: 4.31.

To one molar equivalent of the base 2-benzilamidopyridine in ethanol, add more than one molar equivalent of hydrogen chloride dissolved in ether. Recrystallize the resultant precipitate from ethanol to yield 2-benzilamidopyridine hydrochloride having a melting point of 205 degrees centigrade. Analyze a portion of the hydrochloride salt as follows.

Analysis:

|  | Percent by weight | | |
| --- | --- | --- | --- |
|  | Carbon | Hydrogen | Ionic Chlorine |
| Calculated | 66.96 | 5.03 | 10.40 |
| Found | 67.41 | 5.09 | 10.35 |

*Preparation 3: 4 - (O-acetylmandelamido)-pyridine.*—Mix in a reaction flask, 25.0 grams (0.12 mole) of acetylmandelyl chloride, 11.1 gram (0.12 mole) of 4-aminopyridine and 25 grams (0.23 mole) or anhydrous sodium carbonate in 100 milliliters of benzene. Fit a steam bath around the reaction flask. Heat the steam bath to reflux the reaction mixture for 7 hours. Swirl the reaction mixture occasionally during the period. Cool the mixture and wash it with water. Separate the water layer from the benzene layer. Extract the water layer with fresh benzene. Separate the fresh benzene layer from the water layer. Combine the fresh benzene portion with the original benzene portion. Dry this combined benzene solution and concentrate it by distillation in vacuo to yield 17.0 grams (53 percent yield) of product, 4-(O-acetylmandelamido)-pyridine as a light yellow oil residue after distillation of the benzene from the solution. Cool the yellow oil to produce its solidification to a glass.

The following Table I illustrates the preparation of other pyridyl carbamyl alkane intermediates of the invention. The procedure used is analogous to that employed in the foregoing preparation whose number is listed in the column entitled "Method" in Table I.

TABLE I

| Preparation | Compound | Melting Range, Degrees Centigrade | Method | Carbon, Percent by weight Calculated | Found | Hydrogen, Percent by weight Calculated | Found | Ionic Chlorine, Percent by weight Calculated | Found | Basic Nitrogen, Percent by weight Calculated | Found |
|---|---|---|---|---|---|---|---|---|---|---|---|
| 4 | 2-mandelamido-4-picoline | 143–146 | 1 | | | | | | | 5.78 | 5.72 |
|   | Hydrochloride salt | 188–189 | | 60.34 | 60.56 | 5.42 | 5.68 | 12.74 | 12.66 | | |
| 5 | 6-mandelamido-2-4-lutidine | 167–169 | 1 | | | | | | | 5.46 | 5.40 |
|   | Hydrochloride salt | 195–196 | | 61.54 | 61.82 | 5.85 | 5.84 | 12.11 | 11.86 | | |
| 6 | 6-mandelamino-3-picoline | 141–142 | 1 | | | | | | | 5.78 | 5.62 |
|   | Hydrochloride sale | 203 | | 60.34 | 60.57 | 5.42 | 5.32 | 12.74 | 12.15 | | |
| 7 | 2-mandelamido-5-chloropyridine | 146–148 | 1 | | | | | | | 5.33 | 4.98 |
|   | Hydrochloride salt | 169 | | 52.20 | 52.07 | 4.04 | 4.14 | 11.85 | 11.81 | | |
| 8 | 2-mandelamido-5-bromopyridine | 155–156 | 1 | | | | | | | 4.56 | 4.36 |
|   | Hydrochloride salt | | | 45.43 | 45.79 | 3.52 | 3.43 | 10.32 | 9.94 | | |
| 9 | 2-(hexahydromandelamido) pyridine | 118–120 | 1 | | | | | | | 5.98 | 6.06 |
| 10 | 2-(O-acetylmandelamido)-3, 5-dibromopyridine | Oil | 3 | | | | | | | | |
| 11 | 2-(4-bromomandelamido)- pyridine | 146–147 | 1 | | | | | | | 4.56 | 4.55 |
|   | Hydrochloride salt | 197–198 | | 45.44 | 45.84 | 3.52 | 3.52 | 10.32 | 10.31 | | |

*Preparation 12: Optically active 2-(O-acetylmandelamido)-pyridine.*—Using essentially the same procedure as described in Preparation 3, substituting triethylamine for sodium carbonate and *d*-O-acetylmandelyl chloride for *dl*-O-acetylmandelyl chloride, there is obtained an optically active 2-(O-acetylmandelamido)-pyridine as a thick intractable oil.

The following examples are illustrative of the preparation of the pyridyl amino alkane derivatives of the invention.

*Example 1.* — *2(Beta-Hydroxy-Beta-Phenylethylamino) Pyridine and Salts Thereof*

Form a slurry of 35.0 grams (0.92 mole) of lithium aluminum hydride in 1400 milliliters of dry ethylene glycol dimethyl ether. Add to the slurry, in small portions with stirring 140 grams (0.61 mole) of 2-mandelamidopyridine, produced as set forth in Preparation 1 above. After the addition is complete, stir the reaction mixture for 5 hours at room temperature. Thereafter, add ethyl acetate to the product mixture to decompose excess lithium aluminum hydride. Add water cautiously to the ice cold product mixture, acidify it with dilute hydrochloric acid, and concentrate it by distillation in vacuo to a small volume to remove the ethylene glycol dimethyl ether from the product. Add an aqueous solution of 100 grams of tartaric acid to the residual material remaining after distillation. Make the resulting solution strongly alkaline and extract it with ether. Dry the ether extract and remove the ether by distillation to yield an oil residue. Crystallize the oil residue from benzene-Skellysolve B solvent and then recrystallize it from aqueous methanol to yield 106 grams (81 percent yield) of colorless crystals of 2-(beta-hydroxy-beta-phenylethylamino)-pyridine, melting at 83–85 degrees centigrade. Analyze a portion of the product as follows:

*Analysis.*—Nitrogen(basic) percent by weight. Calculated: 6.54. Found: 6.44.

To one molar equivalent of the base 2-(beta-hydroxy-beta-phenylethylamino)-pyridine in ether, add more than one molar equivalent of hydrogen chloride dissolved in ether. Recrystallize the resultant precipitate from a mixture of ethanol and ether to yield colorless, hydrogroscopic crystals of 2-(beta-hydroxy-beta-phenylethylamino)-pyridine hydrochloride, melting with gas evolution at 140–142 degrees centigrade Analyze a portion of the hydrochloride salt as follows.

Analysis:

| | Percent by weight | | |
|---|---|---|---|
| | Carbon | Hydrogen | Ionic Chlorine |
| Calculated | 62.27 | 6.03 | 14.14 |
| Found | 62.54 | 6.17 | 13.92 |

To one molar equivalent of the base 2-(β-hydroxyphenethylamino)-pyridine in ethyl acetate, add more than one molar equivalent of salicylic acid to precipitate 2-(β-hydroxyphenethylamino) - pyridine salicylate in the form of a crystalline solid melting at 91–94 degrees centigrade.

*Analysis.* — Calculated: N(basic), 3.98. Found: N(basic), 3.93.

Dissolve a molar part of 2-(beta-hydroxy-beta-phenylethylamino)-pyridine in ethanol. Add an ethanol solution containing in excess of one molar equivalent of methyl iodide. A precipitate forms. Recrystallize the precipitate from a solvent mixture of ethanol and methanol to yield 2-(beta-hydroxy-beta-phenylethyl-amino) - pyridine methiodide, melting at 165–167 degrees centigrade. Analyze a portion of the methiodide salt as follows.

Analysis:

| | Percent by weight | | |
|---|---|---|---|
| | Carbon | Hydrogen | Ionic Iodine |
| Calculated | 47.21 | 4.81 | 35.64 |
| Found | 47.54 | 5.20 | 35.24 |

The compounds of this example, not only have utility as analgesics, but also as barbiturate potentiators, interneuronal blocking agents, and anti-fibrillatory agents. The salt 2-(beta-hydroxy-beta-phenylethylamino)-pyridine hydrochloride shows the following pharmacological activity in animals.

The hydrochloride, where administered intraperitoneally or orally to mice, increases by 10 percent to 16 percent the reaction time to pain produced by radiant heat on the tail of the mice. By comparison codeine sulfate administered intraperitoneally increases the reaction time 10 to 14 percent; codeine sulfate administered orally increases the reaction time to pain 10 percent; and morphine sulfate administered orally increases the reaction time to pain 16 percent.

Further, the hydrochloride, when administered orally in doses of about 50 to 200 milligrams, provides analgesia in man in a variety of types of pain such as arthritic pain.

This demonstrated the analgesic pharmacological activity of the compounds of this example.

The hydrochloride of this example, when administered intraperitoneally or intravenously to mice in conjunction with intravenous administration of hexobarbital, increases by 50 percent to 100 percent the sleep time of the mice over the sleep time caused by hexobarbital alone. This demonstrates the pharmacological activity of the compounds of this example as barbiturate potentiators.

The interneuronal blocking activity of the compounds of this example is demonstrated by the measurement of the flexor reflex of a dog under stimulus by an electronic stimulator. The hydrochloride, when administered intravenously to a dog, causes 25 to 75 percent block of muscle twitch for duration of 15 to 20 minutes.

The anti-fibrillatory activity of the compounds of this example are demonstrated by a test on dogs. Auricular fibrillation is induced in dogs by application of aconitine directly into the right auricle. The drugs in Table II below were administered intravenously at a rate of 2 milligrams of drug per kilogram of dog body weight per minute. The activity of the drug is based on the dose in milligrams of drug per kilogram of dog body weight necessary to stop or markedly reduce the auricular fibrillation.

TABLE II

| Drug | Dose in milligrams of drug per kilogram of dog body weight necessary to stop fibrillation |
|---|---|
| 2-(beta-hydroxy-beta-phenylethylamino)-pyridine hydrochloride. | 8 to 12. |
| Quinidine sulfate | 6 to 10. |
| Procaine amide | Greater than 18. |

The above Table II demonstrates that the compounds of this example have substantial anti-fibrillatory action.

*Example 2.—2-(Beta-Hydroxy-Beta-Phenylethylamino)-Pyridine and Salt Thereof*

This example illustrates an alternate method for the preparation of compounds of Example 1.

Introduce approximately 250 milliliters of liquid ammonia into a 500 milliliter, 3-necked reaction flask. Add to the ammonia in the flask, with mechanical stirring, first 12.9 grams (0.33 mole) of commercial sodamide and then 28.2 grams (0.3 mole) of 2-aminopyridine in small portions. Stir the reaction mixture in the flask for 45 minutes and then add dropwise 32.4 grams (0.27 mole) of styrene oxide. Continue stirring for 5 hours. Replace the ammonia, as it evaporates, with 125 milliliters of dry toluene. Add isopropyl alcohol to the product mixture to decompose the excess sodamide. Wash the product mixture with water and then extract it with successive portions of 10 percent hydrochloric acid. Separate successively the acidic aqueous layers from the toluene layer. Combine the separated aqueous portions and wash the combined aqueous solution with ether. Separate the ether layer from the aqueous layer. Make the solution alkaline with aqueous ammonia and extract it with ether. Dry the combined ether extracts and remove the ether by distillation. Recrystallize the residue remaining after removal of ether from benzene-Skellysolve B solvent to yield 24.2 grams (42 percent yield) of 2-(beta-hydroxy-beta-phenylethylamino)-pyridine, melting at 82–85 degrees centigrade.

From the product of the preceding paragraph, prepare 2-(beta-hydroxy-beta-phenylethylamino)-pyridine hydrochloride in the same manner as disclosed in Example 1.

*Example 3.—4-(Beta-Hydroxy-Beta-Phenylethylamino)-Pyridine and Salt Thereof*

Form a slurry of 5.0 grams (0.13 mole) of lithium aluminum hydride in 300 milliliters of dry ether in a flask. Dissolve 15.0 grams (0.05 mole) of 4-(O-acetylmandelamido)-pyridine, produced in Preparation 3 above, in 175 milliliters of a dry 1:1 by volume solvent mixture of tetrahydrofuran and ether. Add the solution of 4-(O-acetylmandelamido)-pyridine, dropwise with stirring, to the slurry. Fit a steam bath around the reaction flask. Stir the reaction mixture and reflux it for 3 hours by heating the steam bath. Thereafter, add ethyl acetate to the product mixture to decompose excess lithium aluminum hydride. Next add water to the product mixture. Acidify the product mixture by adding 10 percent aqueous hydrochloric acid. Separate the aqueous layer from the water-immiscible layer. Add 40 grams of tartaric acid to the separated aqueous layer. Next, make the aqueous layer strongly alkaline and thereafter extract it with ether. Dry the ether extract and remove the ether therefrom by distillation, leaving as a residue 10.0 grams (83 percent yield) of 4-(beta-hydroxy-beta-phenylethylamino)-pyridine as a light yellow oil which does not crystallize.

To one molar equivalent of the base 4-(beta-hydroxy-beta-phenylethylamino)-pyridine in ether, add more than one molar equivalent of hydrogen chloride dissolved in ether. Cool the mixture to form a precipitate. Recrystallize the precipitate from a solvent mixture of ethanol and ether to yield 4-(beta-hydroxy-beta-phenylethylamino)-pyridine hydrochloride, melting at 132–133 degrees centigrade. Analyze a portion of the hydrochloride as follows.

Analysis:

| | Percent by weight | | |
|---|---|---|---|
| | Carbon | Hydrogen | Ionic Chlorine |
| Calculated | 62.29 | 6.03 | 14.14 |
| Found | 61.83 | 5.99 | 14.07 |

The compound of this example, 4-(beta-hydroxy-beta-phenylethylamino)-pyridine hydrochloride has pharmacological properties, not only as an analgesic, but additionally as a barbiturate potentiator.

*Example 4.—2-(Beta-Hydroxy-Beta-Phenylethylamino)-4-Picoline and Salt Thereof*

Form a slurry of 5.0 grams (0.13 mole) of lithium aluminum hydride in 300 milliliters of dry ether in a reaction flask. Dissolve 20.0 grams (0.08 mole) of 2-mandelamido-4-picoline, prepared by Preparation 4, in 150 milliliters of dry purified tetrahydrofuran. Add the solution to the slurry dropwise, with stirring. Thereafter, add an additional 100 milliliters of tetrahydrofuran to the reaction mixture. Then stir and heat the reaction mixture for 7 hours. Next add ethyl acetate to the product mixture to decompose excess lithium aluminum hydride. Then cautiously add water to the product mixture, while cooling the flask in ice. Acidify the product mixture with 10 percent hydrochloric acid. Separate the aqueous layer from the water-immiscible layer. Add 40 grams tartaric acid to the separated aqueous solution. Make the aqueous solution strongly alkaline with 20 percent sodium hydroxide to precipitate an oil. Dissolve the oil in ether. Dry the ether solution and remove the ether by distillation to leave a residue oil. Crystallize the oil from isopropyl alcohol to yield 15.5 grams (85 percent yield) of 2-(beta-hydroxy-beta-phenylethylamino)-4-picoline, melting at 90–91 degrees centigrade. Analyze a portion of the product as follows:

*Analysis.*—Nitrogen (basic) percent by weight. Calculated: 6.13. Found: 6.01.

To one molar equivalent of the base 2-(beta-hydroxy-beta-phenylethylamino)-4-picoline in ether, add more than one molar equivalent of hydrogen chloride dissolved in ether. Recrystallize the precipitate from a solvent mixture of ethanol and ether to yield colorless needle-shaped crystals of 2 - beta-hydroxy-beta-phenylethylamino)-4-picoline hydrochloride melting at 135–136 degrees centigrade. Analyze a portion of the hydrochloride as follows.

Analysis:

|  | Percent by weight | | |
|---|---|---|---|
|  | Carbon | Hydrogen | Ionic Chlorine |
| Calculated | 63.53 | 6.47 | 13.40 |
| Found | 63.65 | 6.58 | 13.19 |

The compound of this example, 2-(beta-hydroxy-beta-phenyl-ethylamino)-4-picoline hydrochloride has pharmacological properties, not only as an analgesic, but also as a barbiturate potentiator, and as an anti-fibrillatory agent.

The following Table III discloses additional pyridyl amino alkane derivatives of this invention. Each of the compounds disclosed in Table III is prepared according to the procedures similar to those outlined in Example 4 above. All of the following compounds exhibit qualitatively analgesic activity, so only the additional pharmacological activities present are specifically set forth.

*Example 13.—2-(Gamma-Hydroxy-Gamma-Phenylpropylamino)-Pyridine and Salt Thereof*

Introduce into a reaction flask 25.0 grams (0.17 mole) of 3-amino-1-phenyl propanol, 18.8 grams (0.17 mole) of 2-chloropyridine, and 29 grams of powdered sodium carbonate. Fit an oil bath around the reaction flask. Heat the reaction mixture in the flask for 9 hours by maintaining the oil bath temperature at about 190 degrees centigrade. Thereafter, cool the product mixture with resultant solidification of the mixture. Add benzene to the product mixture and warm. Filter the mixture to remove inorganic solid from the benzene filtrate. Wash the filtered solid with fresh benzene. Concentrate the combined benzene filtrate by distilling off benzene to obtain a light yellow oil residue. Dissolve the oil in ether and extract the ether solution with 10 percent hydrochloric acid. Make the acid solution strongly alkaline and extract with several portions of ether. Dry and distill the combined ether extracts to leave a light yellow oil which partially solidifies. Crystallize the mixture of oil and solid from isopropyl alcohol to yield 8.6 grams

TABLE III

| Example | Compound | Melting Range, Degrees Centigrade | Starting Material Prepared In Preparation | Additional Pharmacological Properties | Carbon, Percent by weight | |
|---|---|---|---|---|---|---|
|  |  |  |  |  | Calculated | Found |
| 5 | 6-(beta-hydroxy-beta-phenyl-ethylamino)-2,4-lutidine. | 77–78 | 5 | Barbiturate potentiator, anti-fibrillatory agent. | | |
|  | Hydrochloride salt | 132–133 | | Barbiturate potentiator, anti-fibrillatory agent. | 64.64 | 64.67 |
| 6 | 6-(beta-hydroxy-beta-phenyl-ethylamino)-3-picoline. | 97–99 | 6 | | | |
|  | Hydrochloride salt | 116–117 | | | 63.53 | 63.03 |
| 7 | 2-(beta-hydroxy-beta-phenyl-ethylamino)-5-chloropyridine. | 102–103 | 7 | Barbiturate potentiator | | |
|  | Hydrochloride salt | 177–178 | | Barbiturate potentiator | 54.76 | 55.01 |
| 8 | 2-(beta-hydroxy-beta-phenyl-ethylamino)-5-bromopyridine. | 110–111 | 8 | | | |
|  | Hydrochloride salt | 187–189 | | | 47.36 | 47.83 |
| 9 | 2-(beta-hydroxy-beta-cyclohexylethylamino)-pyridine. | 86–88 | 9 | | | |
|  | Hydrochloride salt | 143–144 | | | 60.80 | 60.76 |
| 10 | 2-(beta-hydroxy-beta, beta-diphenylethyl-amino)-pyridine. | 167–169 | 2 | | | |
|  | Hydrochloride salt | 201–202 | | | 69.81 | 69.72 |
| 11 | 2-(beta-hydroxy-4-bromophen-ethylamine)-pyridine. | 105–106 | 11 | | | |
|  | Hydrochloride salt | 135–136 | | | | |
| 12 | 1-2-(beta-hydroxy-phenethyl-amino)-pyridine. | 102–105 | 12 | | 62.27 | 62.89 |
|  | Hydrochloride salt | 124–126 | | | | |

| Example | Compound | Hydrogen, Percent by weight | | Ionic Chlorine, Percent by weight | | Basic Nitrogen, Percent by weight | |
|---|---|---|---|---|---|---|---|
|  |  | Calculated | Found | Calculated | Found | Calculated | Found |
| 5 | 6-(beta-hydroxy-beta-phenyl-ethylamino)-2,4-lutidine. | | | | | 5.77 | 5.65 |
|  | Hydrochloride salt | 6.87 | 6.82 | 12.72 | 12.56 | | |
| 6 | 6-(beta-hydroxy-beta-phenyl-ethylamino)-3-picoline. | | | | | 6.13 | 5.92 |
|  | Hydrochloride salt | 6.47 | 6.17 | 13.40 | 13.43 | | |
| 7 | 2-(beta-hydroxy-beta-phenyl-ethylamino)-5-chloropyridine. | | | | | 5.63 | 5.43 |
|  | Hydrochloride salt | 4.95 | 5.16 | 12.43 | 12.38 | | |
| 8 | 2-(beta-hydroxy-beta-phenyl-ethylamino)-5-bromopyridine. | | | | | 4.78 | 4.81 |
|  | Hydrochloride salt | 4.28 | 4.40 | 10.75 | 10.70 | | |
| 9 | 2-(beta-hydroxy-beta-cyclohexylethylamino)-pyridine. | | | | | 6.36 | 6.23 |
|  | Hydrochloride salt | 8.24 | 8.21 | 13.80 | 13.72 | | |
| 10 | 2-(beta-hydroxy-beta, beta-dipehnyl-ethyl-amino)-pyridine. | | | | | 4.82 | 4.74 |
|  | Hydrochloride salt | 5.86 | 5.98 | 10.85 | 10.73 | | |
| 11 | 2-(beta-hydroxy-4-bromophen-ethylamino)-pyridine. | | | | | 4.78 | 4.78 |
|  | Hydrochloride salt | | | 10.76 | 10.72 | | |
| 12 | 1-2-(beta-hydroxyphenethylamino)-pyridine. | | | | | 6.54 | 6.49 |
|  | Hydrochloride salt | 6.03 | 6.19 | 14.14 | 14.10 | | |

$[\alpha]_D^{25} -64.8° \pm 0.5°$ (C=2 percent in ethanol).

of 2-(gamma-hydroxy-gamma-phenylpropylamino)-pyridine, melting at 123–124 degrees centigrade. Analyze a portion of the product as follows:

*Analysis.*—Nitrogen (basic) percent by weight. Calculated: 6.13. Found: 6.07.

To one molar equivalent of the base 2-(gamma-hydroxy-gamma-phenylpropylamino)-pyridine in ether, add more than one molar equivalent of hydrogen chloride dissolved in ether. Recrystallize the precipitate from a solvent mixture of ethanol and ether to yield 2-(gamma-hydroxy-gamma-phenylpropyl - amino) - pyridine hydrochloride melting at 138–140 degrees centigrade. Analyze a portion of the hydrochloride as follows.

Analysis:

|  | Percent by weight | | |
| --- | --- | --- | --- |
|  | Carbon | Hydrogen | Ionic Chlorine |
| Calculated | 63.53 | 6.47 | 13.39 |
| Found | 62.96 | 6.55 | 13.35 |

The hydrochloride of this example has pharmacological utility not only as an analgesic but additionally as a barbiturate potentiator.

*Example 14.—2-[N-(Beta-Hydroxy-Beta-Phenylethyl)-Methylamino]-Pyridine and Salt Thereof*

Dissolve 30.0 grams (0.14 mole) of 2-(beta-hydroxy-beta-phenyl ethylamino)-pyridine, prepared by Example 4, in 100 milliliters of isopropyl alcohol in a reaction flask. Add 18 grams of 37 percent formaldehyde (0.22 mole) to the solution. Fit a steam-bath around the reaction flask. Heat the mixture in the flask for 2 hours by heating the steam-bath. Thereafter, concentrate the product mixture by distilling out the isopropyl alcohol, water and excess formaldehyde. The residue remaining is 33 grams of 3-(2-pyridyl)-5-phenyloxazolidine as a thick oil which does not crystallize.

Form a slurry of 6.5 grams (0.17 mole) of lithium aluminum hydride in 259 milliliters of dry ether in a flask. Dissolve 27 grams (0.12 mole) of the crude 3-(2-pyridyl)-5-phenyloxazolidine in ether. Add the solution to the slurry dropwise with stirring. Fit a steambath around the flask. Stir and reflux the reaction mixture by heating the steam-bath for 3 hours. Thereafter, add ethyl acetate to the product mixture to decompose excess lithium aluminum hydride. Then cautiously introduce water into the product mixture. Acidify the product mixture with aqueous 10 percent hydrochloric acid. Separate the aqueous layer from the water-immiscible layer. Add 49 grams of tartaric acid to the separated aqueous solution. Make the aqueous solution alkaline with 20 percent sodium hydroxide and extract it with ether. Dry the ether extract and remove the ether by distillation to leave an oil residue. Distill the oil in vacuo to yield 12.4 grams (45 percent yield) of 2-[N-(beta-hydroxy-beta-phenylethyl)-methylamino]-pyridine, boiling at 147–157 degrees centigrade at 0.3 millimeter of mercury pressure. Analyze a portion of the product as follows:

*Analysis.*—Nitrogen (basic) percent by weight. Calculated: 6.13. Found: 6.16.

To one molar equivalent of the base 2-[N-(beta-hydroxy-beta-phenylethyl)-methylamino]-pyridine in ether, add more than one molar equivalent of hydrogen chloride dissolved in ether. Recrystallize the precipitate from a solvent mixture of ethanol and ether to yield 2-[N-(beta - hydroxy - beta - phenylethyl) - methylamino]-pyridine hydrochloride, melting at 170–173 degrees centigrade. Analyze a portion of the hydrochloride as follows:

|  | Percent by weight | | |
| --- | --- | --- | --- |
|  | Carbon | Hydrogen | Ionic Chlorine |
| Calculated | 63.53 | 6.47 | 13.40 |
| Found | 62.75 | 6.37 | 13.25 |

*Example 15.—2-(Beta-Acetoxy-Beta-Phenylethylamino)-Pyridine Hydrochloride*

Dissolve 10.7 grams (0.05 mole) of 2-(beta-hydroxy-beta-phenylethylamino)-pyridine, produced by Example 1, in 50 milliliters of glacial acetic acid in a flask. Add 15 milliliters of ethereal hydrogen chloride and 11.5 milliliters (12.5 grams, 0.12 mole) of acetic anhydride to the solution. Fit a steam-bath around the reaction flask. Warm the reaction solution in the flask for one hour by heating the steam-bath. Thereafter, allow the reaction solution to stand at room temperature for two days. Next, concentrate the product mixture in the flask by distilling out the volatile components in vacuo. Dissolve the residue remaining after distillation in isopropyl alcohol. Add ether to the solution to precipitate an oil. Separate the oil from the solvent layer. Dry the oil and redissolve it in isopropyl alcohol. Add ether to the solution to reprecipitate the oil. Separate the oil from the solvent layer. Dry the separated oil over phosphorous pentoxide in vacuo to yield 10.5 grams (72 percent yield) of hygroscopic, pale yellow crystals of 2-(beta-acetoxy-beta - phenylethylamino) - pyridine hydrochloride that shrinks and softens at about 55 degrees centigrade and flows at about 80 degrees centigrade. Analyze a portion of the product as follows:

Analysis:

|  | Percent by weight | | | |
| --- | --- | --- | --- | --- |
|  | Carbon | Hydrogen | Ionic Chlorine | O-Acetyl |
| Calculated | 61.54 | 5.85 | 12.11 | 14.7 |
| Found | 61.40 | 6.07 | 11.51 | 13.2 |

*Example 16.—2-[Beta-(N-n-Butyl-Carbamyloxy)-Beta-Phenylethyl-Amino]-Pyridine*

Dissolve 11.3 grams (0.053 mole) of 2-(beta-hydroxy-beta-phenylethylamino)-pyridine, produced by the process of Example 2, in 50 milliliters of benzene. Add 5.2 grams (0.052 mole) of n-butyl-isocyanate and allow the resulting solution to stand for 20 hours at room temperature. Dilute the solution with Skellysolve B to the point of cloudiness. Collect the precipitate to obtain 7.4 grams of 2-[beta-(N-n-butyl-carbamyloxy) - beta - phenylethylamino]-pyridine, melting at 95–98 degrees centigrade. Analyze a portion of the product as follows:

Analysis:

|  | Percent by weight | | |
| --- | --- | --- | --- |
|  | Carbon | Hydrogen | Nitrogen (basic) |
| Calculated | 69.01 | 7.40 | 4.47 |
| Found | 68.66 | 7.44 | 4.46 |

*Example 17.—2-[Beta-(N-Ethyl-Carbamyloxy)-Phenethylamino]-Pyridine*

Using the method of Example 16, mix 2-(beta-hydroxy-phenethylamino)-pyridine with ethyl isocyanate to yield 2-[beta-(N-ethyl-carbamyloxy) - phenethylamino] - pyridine, melting at 132–134 degrees centigrade.

*Analysis.*—Nitrogen (basic) percent by weight. Calculated: 4.91. Found: 4.89.

To one molar equivalent of the base 2-[beta-(N-ethylcarbamyloxy)-phenethylamino]-pyridine in a solvent mixture of isopropyl alocohl-ether, add more than one molar equivalent of hydrogen chloride dissolved in ether. Recrystallize the precipitate from a solvent mixture of ethanol and ether to yield 2-[beta-(N-ethyl-carbamyloxy)-phenethylamino]-pyridine hydrochloride melting at 75–78 degrees centigrade.

Analysis:

|  | Percent by weight |  |  |
|---|---|---|---|
|  | Carbon | Hydrogen | Chlorine |
| Calculated | 59.72 | 6.26 | 11.02 |
| Found | 59.59 | 6.06 | 11.03 |

*Example 18.*—*3-(Beta-Hydroxyphenethylamino)-Pyridine*

Using the method of Example 2, mix 3-aminopyridine with styrene oxide to yield 3-(beta-hydroxyphenethylamino)-pyridine boiling between 195–202 degrees centigrade (0.3 millimeters of mercury pressure).

*Analysis.*—Nitrogen (basic) percent by weight. Calculated: 6.53. Found: 6.56.

3-(beta-hydroxyphenethylamino) - pyridine hydrochloride, after recrystallization from a solvent mixture of isopropyl alcohol-ethyl acetate, is obtained as a crystalline solid.

*Analysis.*—Chlorine percent by weight. Calculated: 14.14. Found: 14.10.

*Example 19.*—*2-(Beta-Hydroxy-4-Chlorophenethylamino)-Pyridine*

Using the method of Example 2, mix 2-aminopyridine with 4-chlorostyrene oxide to yield 2-(beta-hydroxy-4-chlorophenethylamino)-pyridine melting at 91–98 degrees centigrade.

*Analysis.*—Nitrogen (basic) percent by weight. Calculated: 5.63. Found: 5.58.

2-(beta-hydroxy-4-chlorophenethylamino)-pyridine hydrochloride, after recrystallization from a solvent mixture of isopropyl alcohol-ether, melts at 112–123 degrees centigrade.

Analysis:

|  | Percent by weight |  |  |
|---|---|---|---|
|  | Carbon | Hydrogen | Ionic Chlorine |
| Calculated | 54.75 | 4.95 | 12.43 |
| Found | 54.90 | 4.86 | 12.25 |

The invention can be embodied in other specific forms without departing from the spirit or essential characteristics thereof. The foregoing physical embodiments are, therefore, to be considered in all respects illustrative and not restrictive, the scope of the invention being indicated by the appended claims rather than by the foregoing description, and all changes which come within the meaning and range of equivalency of the claims are therefore intended to be embraced therein.

This application is a continuation-in-part of my copending application Serial No. 711,736 filed November 4, 1958, now abandoned.

I claim:
1. A compound of the formula

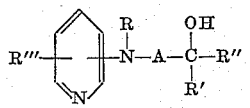

wherein A is lower-alkylene of one to four carbon atoms, inclusive; R is selected from the group consisting of hydrogen and lower-alkyl of from one to six carbon atoms, inclusive; R' is a monocyclic carbocyclic group selected from the group consisting of phenyl, cycloalkyl of from five to six carbon atoms, and aralkyl wherein aryl is phenyl and alkyl is lower-alkyl of from one to six carbon atoms, inclusive, the ring substituents of the monocyclic carbocyclic group being selected from the group consisting of hydrogen, halo, lower-alkyl of from one to six carbon atoms, inclusive, and lower-alkoxy of from one to six carbon atoms, inclusive; R'' is selected from the group consisting of hydrogen, lower-alkyl of from one to six carbon atoms, inclusive, and R'; and R''' is selected from the group consisting of hydrogen, halo, lower-alkyl of from one to six carbon atoms, inclusive, lower-alkoxy of from one to six carbon atoms, inclusive, nitro and trifluoromethyl.

2. The compound 2-(beta-hydroxy-beta-phenylethylamino)-pyridine.
3. The compound 4-(beta-hydroxy-beta-phenylethylamino)-pyridine.
4. The compound 2-(beta-hydroxy-beta-phenylethylamino)-5-chloro-pyridine.
5. The compound 6-(beta-hydroxy-beta-phenylethylamino)-3-picoline.
6. The compound 2 - (beta-hydroxy-beta-cyclohexylethylamino)-pyridine.
7. The compound 2-(beta-hydroxy-beta, beta-diphenylethylamino)pyridine.
8. The compound 2-(gamma-hydroxy-gamma-phenylpropylamino)-pyridine.
9. The compound 2-(beta-hydroxy - 4 - chlorophenylamino)-pyridine.
10. The compound 2-(beta-hydroxy-beta-phenylethylamino)pyridine salicyclic acid addition salt.

References Cited by the Examiner

UNITED STATES PATENTS

| 2,089,569 | 8/37 | Orthner et al. | 260—573 |
| 2,662,097 | 12/53 | Baldwin | 260—573 |
| 2,680,115 | 6/54 | Ruddy et al. | 260—296 |
| 2,871,242 | 1/59 | Seeger et al. | 260—295 |
| 2,946,793 | 6/60 | Michaels et al. | 260—296 |
| 2,948,733 | 8/60 | Pollak | 260—295 |
| 2,970,149 | 1/61 | Huebner | 260—296 |
| 2,975,186 | 3/61 | Bimber | 260—296 |

FOREIGN PATENTS

| 1,051,281 | 2/59 | Germany. |

OTHER REFERENCES

Moore: J. Am. Pharm. Assoc., vol. 33, page 195 (1944).

Williams: "Detoxication Mechanism" (Wiley), page 194 (1947).

WALTER A. MODANCE, *Primary Examiner.*

DUVAL T. McCUTCHEN, IRVING MARCUS,
*Examiners.*

UNITED STATES PATENT OFFICE
CERTIFICATE OF CORRECTION

Patent No. 3,165,527 January 12, 1965

Allan Poe Gray

It is hereby certified that error appears in the above numbered patent requiring correction and that the said Letters Patent should read as corrected below.

Column 1, line 22, for "nirtogen" read -- nitrogen --; lines 41 and 42, for "-dipropycarbamyloxy" read -- -dipropylcarbamyloxy --; column 2, line 24, for "amoino" read -- amino --; column 13, line 67, for "711,736" read -- 771,736 --; column 14, lines 40 and 41, for "4-chlorophenylamino" read -- 4-chlorophenethylamino --.

Signed and sealed this 4th day of May 1965.

(SEAL)
Attest:

ERNEST W. SWIDER
Attesting Officer

EDWARD J. BRENNER
Commissioner of Patents